UNITED STATES PATENT OFFICE.

HAROLD A. RICHMOND AND ROBERT MACDONALD, JR., OF NIAGARA FALLS, NEW YORK, ASSIGNORS TO GENERAL ABRASIVE COMPANY, OF NIAGARA FALLS, NEW YORK, A CORPORATION OF NEW YORK.

ARTIFICIAL CORUNDUM AND PROCESS OF MAKING SAME.

1,413,785. Specification of Letters Patent. Patented Apr. 25, 1922.

No Drawing. Application filed January 7, 1921. Serial No. 435,736.

*To all whom it may concern:*

Be it known that we, HAROLD A. RICHMOND and ROBERT MACDONALD, Jr., citizens of the United States, residing at Niagara Falls, in the county of Niagara and State of New York, have invented new and useful Improvements in Artificial Corundum and Processes of Making Same, of which the following is a specification.

In the preparation of artificial corundum as heretofore practiced, bauxite or emery has been melted with or without a reducing agent and the mass allowed to cool and crystallize. This process produces an artificial corundum suited to the rougher forms of grinding when formed into grinding wheels, but the crystals are too tough and dense to give the best results for certain kinds of grinding, such as surface grinding, cutter and knife grinding, and automatic cylindrical grinding. We have discovered that this toughness is due to the presence of titanium in the ordinary forms of artificial corundum. In the preparation of artificial corundum from bauxite and emery, the presence of titanium cannot well be avoided, since it is present in appreciable quantities in both of them and cannot be reduced, except to a slight degree, in the smelting process above referred to, without at the same time reducing an important amount of the alumina and thus forming aluminum carbide or sub-oxides of aluminum which in time will disintegrate the artificial corundum and destroy its value as an abrasive. If pure amorphous alumina is used in place of emery or bauxite, this same formation of objectionable aluminum carbide occurs, since both the furnace bottom and the electrodes must be made of carbon or graphite, both of which in the absence of other oxides act as powerful reducing agents on the alumina.

We have found that certain varieties of natural corundum containing only a very small amount of titanium, when melted in an electric or other furnace with a suitable reducing agent, in the manner hereinafter described, produces an artificial corundum having properties which especially adapt it when formed into grinding wheels, for surface grinding, cutter and knife grinding,— automatic cylindrical grinding and other purposes. The crystals are larger, harder and more easily fractured than those obtained when bauxite or emery is used, and are substantially free from titanium and aluminum carbide. They are stronger, tougher and denser than crystals made by melting pure amorphous alumina, and are therefore well adapted, when formed into grinding wheels, for a wide variety of grinding operations for which artificial corundum made from pure alumina is not adapted, on account of its extreme friability. Since pure amorphous alumina can be prepared only by a costly chemical process, and since the furnace loss is heavy when such alumina is used, artificial corundum can be produced by our process at far less expense than when made from pure amorphous alumina. The presence of silica and iron oxide in the raw material protects the alumina from the reducing action of the electrodes and furnace bottom, thus avoiding the formation of objectionable carbides or sub-oxides.

In carrying out our process, we proceed as follows:

Natural corundum ore, substantially free from titanium, is broken into grains or lumps of suitable size, say not exceeding three inches across, and melted in any appropriate furnace, preferably an electric furnace of the open top type. Steel chips are added in sufficient quantity to make the total quantity of iron in the charge three or more times the amount of silicon present, so that the resulting ferrosilicon will be magnetic. Iron in various forms may be used in place of steel chips, as mill scale or commercial oxide of iron. Enough pulverized coke is also added to the mixture, so that with the carbon supplied by the wastage of the electrodes and the furnace bottom or sides, most but not all of the silica and iron oxide in the corundum will be reduced at the temperature of the furnace. The ingredients of the charge may be mixed before the charge is fed to the furnace or they may be fed in separately, and the charge is fed gradually to the furnace. A layer of unfused or partly fused material is kept on the surface to reduce heat losses. Carbon or graphite electrodes may be used. The charge must be fed slowly to insure nearly complete reduction of the impurities and uniformity of the product. After a sufficient quantity has been melted, the electric current is shut off and the mass allowed to cool slowly within the furnace, in order to accentuate the production of the large, well defined crystals characteristic of our product. The cooled mass is then broken into grains, and graded into sizes for use. The granular material may be treated in the manner described in United States Patent No. 1,199,041, issued September 26, 1916, to General Abrasive Co., to better prepare it for the manufacture of grinding wheels and other purposes.

The reduced impurities in the furnace unite to form ferro-silicon substantially free from titanium and phosphorus. This may be separated from the crystalline alumina by any appropriate mechanical means and by magnets. Another advantage of our process lies in the fact that the ferro-silicon produced, is superior in quality to that usually obtained, on account of its freedom from objectionable impurities.

Other advantages of the process are:

Less impurities to be removed than when bauxite, emery or other impure forms of alumina are used, with consequent better operation of the furnace, a more uniform product and lessened cost of production.

Less cost of raw materials and less waste, as compared with the use of pure amorphous alumina, and elimination of carbides or suboxides.

The composition of the natural corundum which may be used in our process may vary considerably. The analysis of a quality which has given good results is as follows:

$H_2O$ _____ 2.0%
Alumina _____ 91.1%
Silica _____ 4.5%
Iron oxide _____ 2.2%
Titanium oxide _____ 0.1%

We do not however wish to limit ourselves to this analysis. Any natural corundum or other impure form of aluminum oxide substantially free from titanium may be used. By "substantially free" we mean not over .6 of one per cent of titanium.

A representative analysis of the improved product is as follows:

Alumina _____ 98.5%
Iron oxide _____ 0.5%
Silica _____ 0.8%
Titanium oxide _____ 0.2%

However, we do not wish to limit ourselves to this particular analysis, as it may vary more or less within the scope of our invention as defined in the appended claims.

To give the best results, the percentage of titanium oxide should not exceed 1%; and preferably the iron oxide and silica should not exceed 2% each.

We claim as our invention:

1. The herein described process of making artificial corundum, which consists in melting impure oxide of aluminum, containing not more than .6 of one per cent of titanium, reducing a part of the silica and iron oxide, without materially reducing the titanium oxide, and allowing the mass to cool.

2. The hereindescribed process of making artificial corundum, which consists in melting natural corundum, containing not more than .6 of one per cent of titanium, reducing a part of the silica and iron oxide, and allowing the mass to cool.

3. The hereindescribed process of making artificial corundum, which consists in melting impure oxide of aluminum substantially free from titanium oxide, in the presence of iron, reducing a part of the silica and iron oxide without materially reducing the titanium oxide, and allowing the mass to cool slowly within the furnace.

4. The hereindescribed process of making artificial corundum, which consists in melting natural corundum substantially free from titanium, in the presence of iron, reducing a part of the silica and iron oxide, without material reduction of the titanium oxide, and allowing the mass to cool slowly within the furnace.

5. The hereindescribed process of making artificial corundum, which consists in melting impure oxide of aluminum substantially free from titanium, adding sufficient iron to make the total quantity of iron in the charge not less than three times the quantity of silicon, reducing a part of the silica and iron oxide, and allowing the mass to cool.

6. The hereindescribed process of making artificial corundum, which consists in melting impure oxide of aluminum substantially free from titanium, maintaining a layer of unfused or partly fused material on the top of the fused mass, reducing a part of the silica and iron oxide, and allowing the mass to cool.

7. The hereindescribed process of making artificial corundum, which consists in melting impure oxide of aluminum containing silica and iron oxide, and not more than one per cent of titanium oxide, reducing a part of the silica and iron oxide, without materially reducing the titanium oxide, and allowing the mass to cool slowly.

8. The hereindescribed new product consisting of crystalline alumina, containing less than .6 of one per cent of titanium, .5 to 2 per cent of silica, and .3 to 2 per cent of iron oxide.

9. As a new product, the hereindescribed artificial corundum, consisting of crystalline alumina, containing less than .6 of one per cent of titanium, and appreciable quantities, but not over 2 per cent each, of silica and iron oxide, the crystals being characterized by their relatively dense structure, large size, hardness and brittleness, as compared with other artificial abrasives.

HAROLD A. RICHMOND.
ROBERT MACDONALD, Jr.